July 20, 1937. C. A. NICHOLS ET AL 2,087,809
MANUFACTURE OF ELECTRICAL CONDENSERS
Filed Jan. 25, 1936     3 Sheets-Sheet 1

INVENTORS
Charles A. Nichols and Lora E. Poole
BY Spencer Hardman & Fehr
their ATTORNEYS Patented July 20, 1937

2,087,809

UNITED STATES PATENT OFFICE 2,087,809

MANUFACTURE OF ELECTRICAL CONDENSERS

Charles A. Nichols and Lora E. Poole, Anderson, Ind., assignors to General Motors Corporation, Detroit, Mich., a corporation of Delaware Application January 25, 1936, Serial No. 60,751

14 Claims. (Cl. 226—80)

This invention relates to the manufacture of electrical condensers and more particularly to, the manufacture of a certain type of wound condensers.

This particular type of condenser has its wound body or roll inclosed in a moisture impervious casing with the leads emerging from the open ends of the casing. To seal the condenser roll completely, liquefied wax or similar moisture impervious substance is poured into both ends of the casing and upon the exposed condenser roll therein, where it soon solidifies under ordinary atmospheric conditions.

It is an object of the present invention to provide a machine by which a sealing compound is automatically placed at both ends of a condenser.

In the disclosed embodiment of the present invention this object is accomplished by providing two devices, respectively, for causing a liquefied sealing compound to flow into the ends of the condenser casing, a conveyor for carrying the condensers successively past said devices with one end or the other of the condenser turned up for filling, and means which operates while the conveyor moves the condensers from one filling station to the other to invert the condenser.

The machine embodying the present invention requires the services of an operator merely for deposition of condensers on the machine and for their removal therefrom after the sealing substance has solidified and the condensers have sufficiently cooled off to permit their removal with bare hands. The manual removal of each condenser from the machine will provide opportunity for the operator to inspect the condensers without any additional handling.

Further objects and advantages of the present invention will be apparent from the following description, reference being had to the accompanying drawings wherein a preferred embodiment of the present invention is clearly shown.

Figure 3:
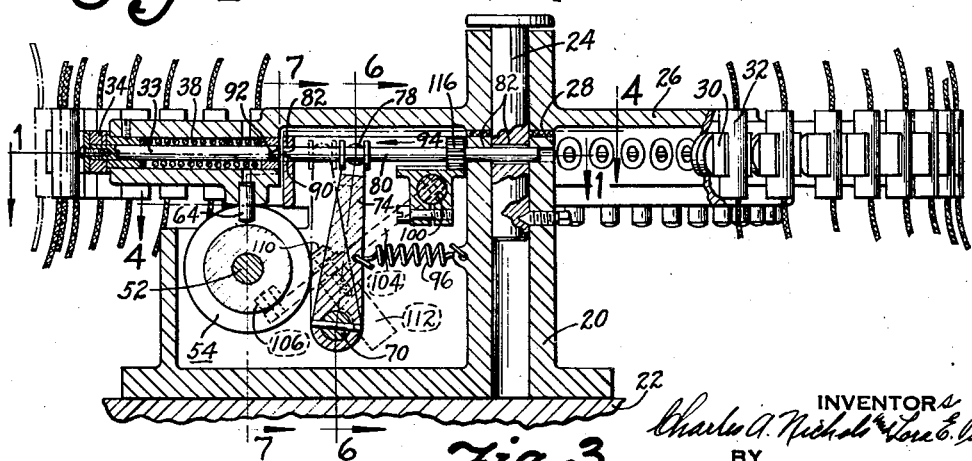
Fig. 3 is a section taken on the line 3—3 of Fig. 2.
Figure 6:
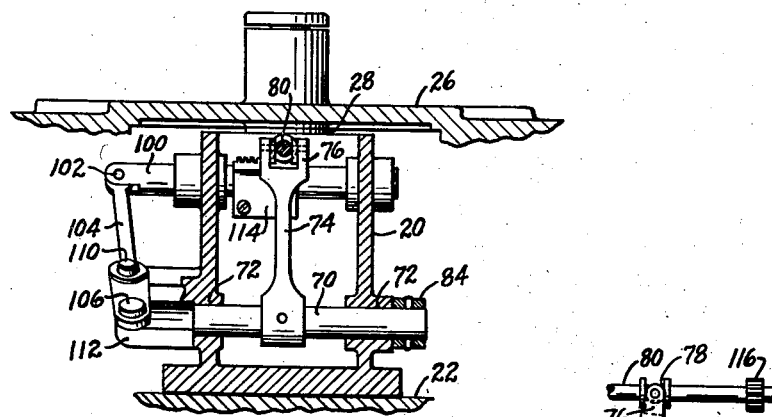
Figure 7:
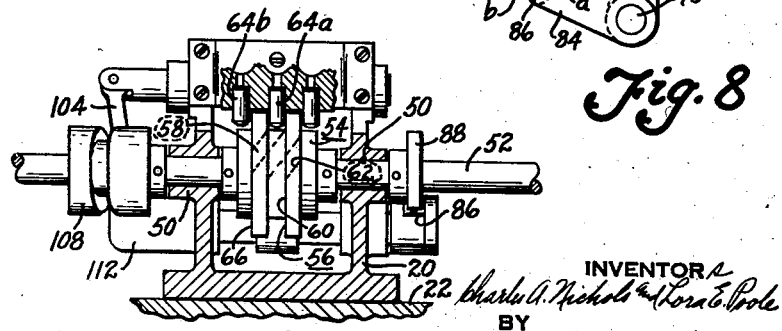

Figs. 6 and 7 are fragmentary sections taken on the line 6—6 and 7—7, respectively, of Fig. 3.

Figure 8:
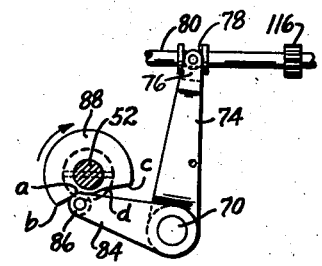

Fig. 8 is a detail view of certain cooperating structure of the machine.

Figures 4, 9:
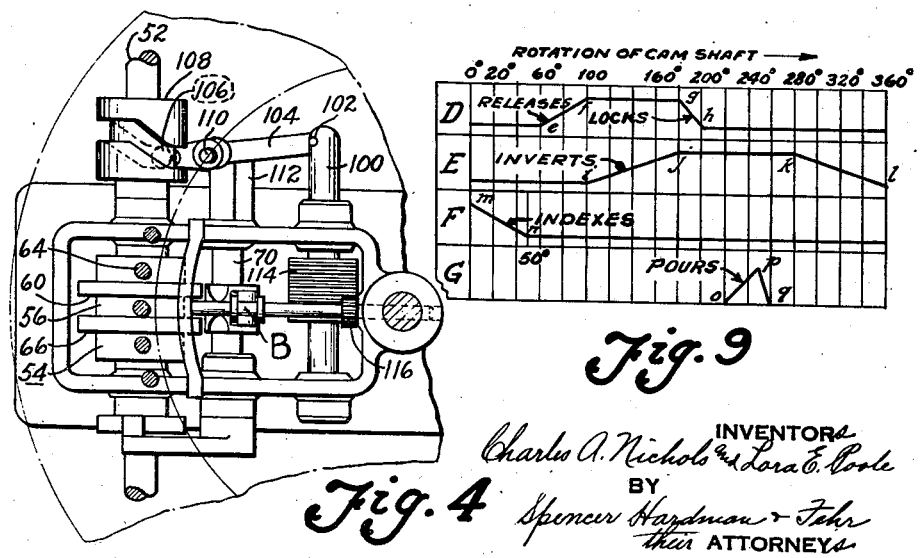
Fig. 4 is a fragmentary section taken on the line 4—4 of Fig. 3.

Fig. 9 is a chart, diagrammatically illustrating the timed relationship which exists between the operation of various devices of the machine.

To gain a better understanding of the detailed description of the machine, the operation thereof will first be briefly explained. The operator of the machine inserts condensers successively into the workholders on a conveyor A which is continuously and automatically indexed so as to bring these condensers successively into vertical alignment, first with one sealing device C1 and then with a second sealing device C2. While the open end of a condenser is in vertical alignment with the first sealing device C1 during an intermittent rest period of the conveyor, a predetermined quantity of liquefied wax is discharged from said device into the adjacent open end of the aligned condenser. The wax deposit is then permitted to solidify before the condenser is inverted 180° shortly before aligning with the second sealing device C2. While the other open end of the condenser is thus in alignment with the second sealing device C2, the latter automatically pours a predetermined quantity of liquefied wax into said condenser end. Thereafter the wax solidifies and the condenser cools off appreciably by the time it reaches the loading and ejecting station X of the conveyor. It follows from the foregoing that a condenser need not be handled while the hot wax or other liquefied sealing substance is applied to both ends of the condenser and until the latter has cooled down to such an extent that its removal from the conveyor and inspection with bare hands does not inconvenience the operator.

Conveyor A

Figure 1:
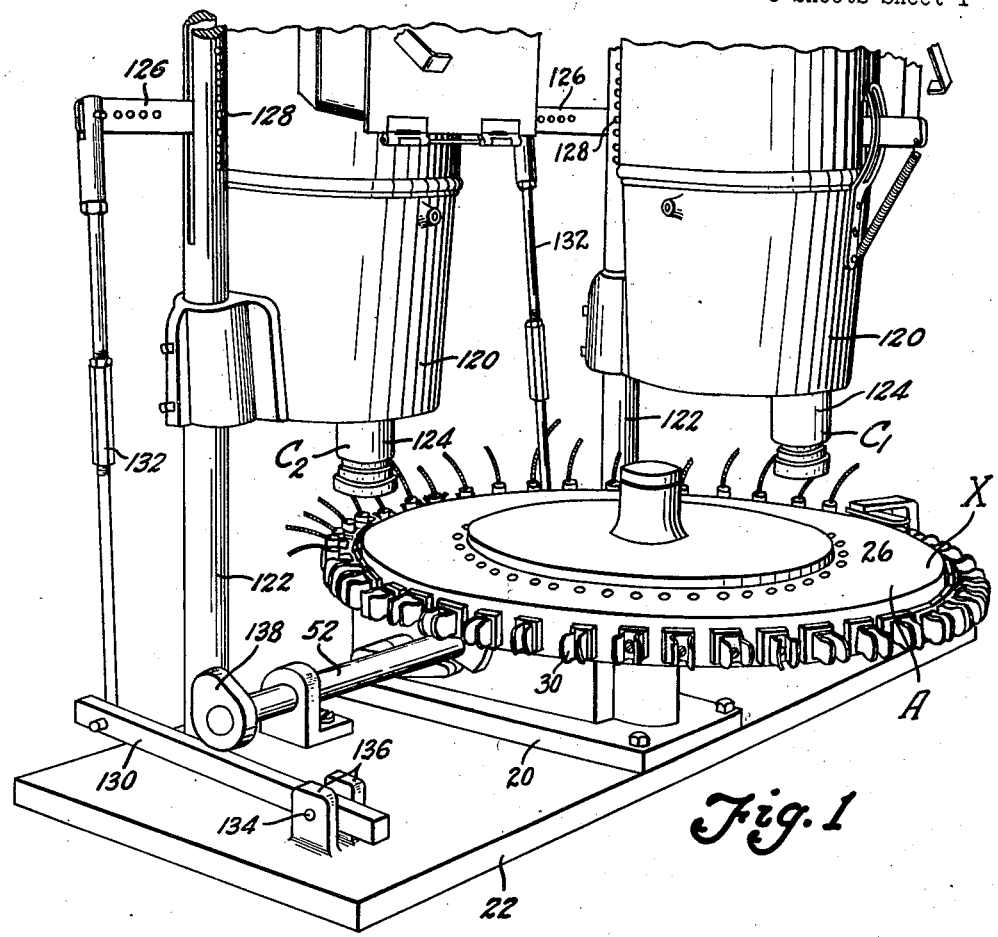
Fig. 1 is a fragmentary perspective view of a machine embodying the present invention.
Figure 2:
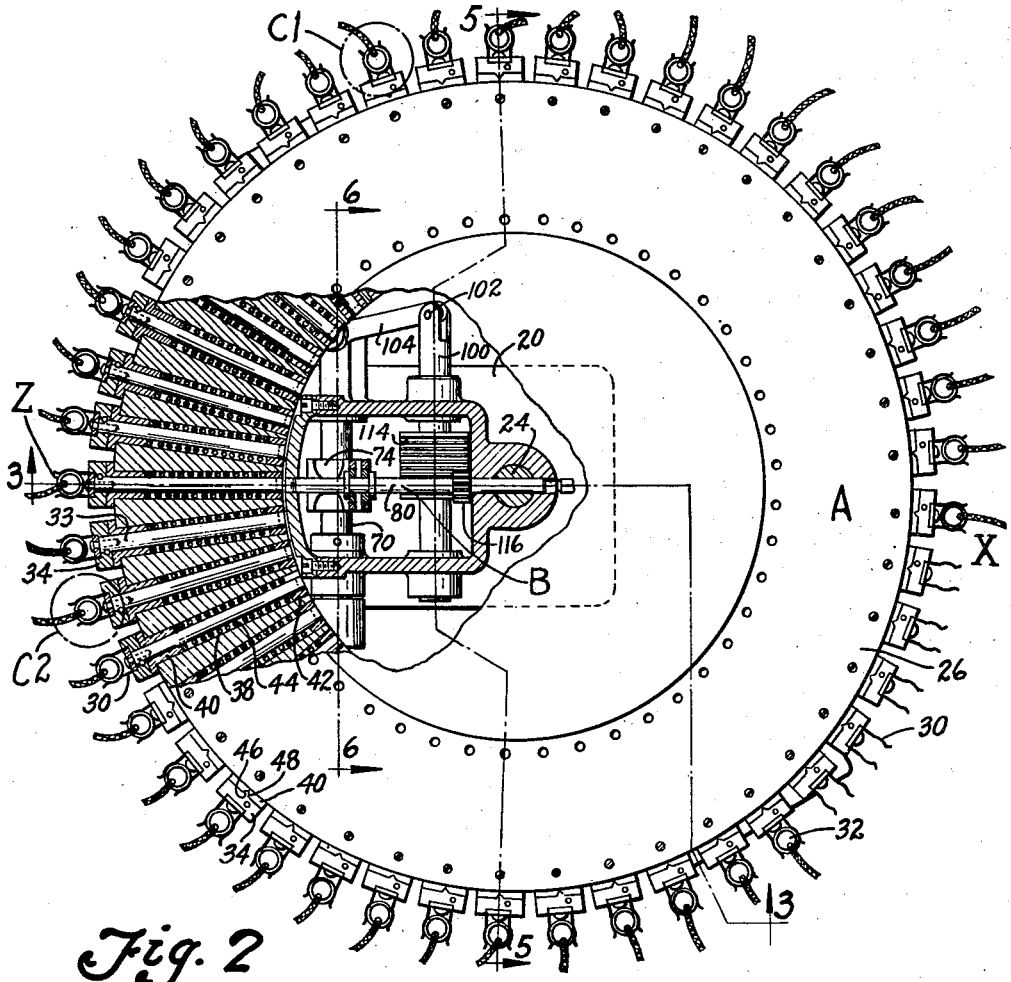
Fig. 2 is a plan view of the conveyor of the machine, part thereof being broken away to show underlying structure in partial section.

Referring more particularly to Figs. 2 and 3, there is shown a base 20 which is mounted on any suitable support 22 (see Fig. 1). Mounted in base 20 in any suitable manner is a vertical stub shaft 24, journaling a conveyor 26 which bears against any suitable thrust bearing 28. Mounted on this conveyor 26 are a plurality of equi-angularly spaced workholders or clips 30 which are adapted yieldingly to hold condensers 3? in the manner illustrated in Fig. 2. These clips 30 are U-shaped and suitably secured to spindles 33, each carrying a stop 34 and being slidable longitudinally in a radial aperture 38 of the conveyor. Press-fitted or otherwise secured in these apertures 38 are bushings 40 in which the spindles 33 slide. Interposed between each bushing 40 and a collar 42 of each spindle 33 is a compressed spring 44, which normally urges the spindle and attached clip into the position shown in Fig. 2, in which stop 34 is in engagement with bushing 40. Each stop 34 and bushing 40 is provided with a diametrically extending ridge 46 and a cooperating groove 48, respectively, which yieldingly lock the clips 30 in vertical position. Upon shifting a spindle 33 against the compression of its spring 44 sufficiently to bring the ridge and groove 46, 48 out of registry with each other, the spindle with its clip and condenser thereon may be inverted 180° so that upon release of spindle 33, the compressed spring 44 will return said rod into the position shown in Fig. 2 in which the cooperating ridge and groove 46, 48 are again in registry with each other.

Mounted in suitable bearings 50 of base 20 is a shaft 52 which is continuously driven in any suitable manner, preferably by an electric motor through intermediation of a suitable reduction gearing (neither shown). Mounted on this shaft 52 is a drum 54 which has a peripheral cam groove 56, comprising a spiral groove portion 58 which merges into a part annular groove portion 60 and terminates into another spiral groove portion 62, parallel to groove portion 58. The conveyor table 26 carries as many equi-angularly spaced pins 64 as there are clips 30. These pins are of such diameter that they may readily enter the cam groove 56 and be operated thereby to index the conveyor table 26 an angular distance equal to that between two consecutive pins 64. Furthermore, the end surfaces 66 of the drum 54 are so spaced from each other that two pins 64 are in close proximity thereto when the pin therebetween is in registry with the angular groove portion 60 as best illustrated in Fig. 7. The spiral groove portions 58 and 62 are so coordinated that when the spiral groove portion 62 cooperates with pin 64a and forces the same together with the conveyor table to the right as viewed in Fig. 7, the succeeding pin 64b is moved into the spiral groove portion 58 and enters the annular groove portion 60 just as pin 64a leaves the spiral groove portion 62.

It can now be understood that the conveyor table is intermittently indexed, although the cam drum 54 is continuously rotated, the intermittent rest periods of the conveyor table occurring when one of the pins 64 is riding in the annular groove portion 60 of cam groove 56.

Inverter B

Figure 5:
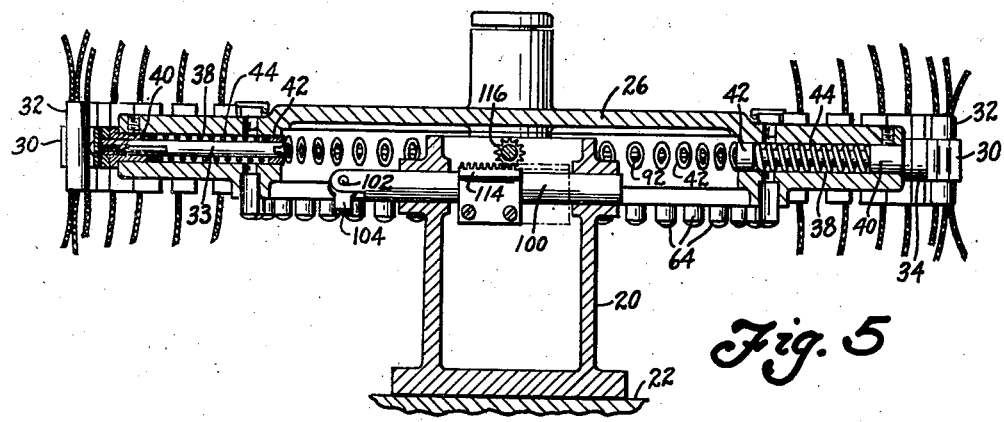
Fig. 5 is a section taken on the line 5—5 of Fig. 2.

Before reaching the second sealing device C2, the condensers on the conveyor table are successively inverted 180° at a station Z (see Fig. 2), so as to bring the non-sealed ends of the condensers into filling relation with the sealing device C2. To that end, a stub shaft 70 is suitably journaled at 72 in base 20 and carries an arm 74, having a bifurcated end 76 engaging an annular groove 78 of a pusher rod 80 which is slidable radially of the conveyor table in suitable openings 82 of base 20 and stub-shaft 24 (see Fig. 3). Also mounted on stub-shaft 70 is an arm 84, carrying a cam follower 86 which cooperates with a cam disc 88, suitably mounted on the cam shaft 52 as best shown in Figs. 7 and 8. One end of pusher rod 80 is flattened on opposite sides so as to provide a driving key 90 which is adapted to fit into a correspondingly shaped notch 92 of each spindle 33. A tension spring 96 normally maintains the follower 86 in engagement with cam disc 88. Rotation of cam shaft 52 results in cooperation between cam disc 88 and follower 86 to cause pusher rod 80 to advance in the direction of arrow 94 in Fig. 3, whereby the key portion 90 first registers with the notch 92 of the aligned spindle 33 and then advances said spindle until its clip and condenser thereon assume the dot-and-dash position in Fig. 3 in which the ridge 46 is out of registry with the groove 48. This takes place while the follower 86 cooperates with the cam portion a—b of cam disc 88, as can be readily understood. During cooperation of the cam follower with the concentric cam portion, the clip and condenser thereon is retained in said dot-and-dash position until the follower cooperates with the cam portion c—d. Slidably mounted in base 20 is another stub shaft 100 which is pivotally connected at 102 to an arm 104, having a cam follower 106 which cooperates with a cam 108. Arm 104 is pivoted at 110 to a lug 112 of the base 20 as best shown in Figs. 3 and 4. Adjustably mounted on stub shaft 100 in any suitable manner is a rack 114 which is in constant mesh with a gear 116, mounted on the pusher rod 80. Cam 108 is so designed as to cause, during a certain cycle of its rotation, movement of stub shaft 100 and rack 114 to the right into the dot-and-dash position shown in Fig. 5, i. e. to such an extent that the rack 114 will rotate gear 116 one-half revolution. More particularly, cam 108 is so coordinated to the cam disc 88, that the former causes the just explained movement of stub-shaft 100 while cam disc 88 retains a clip 30 with condenser in the dot-and-dash position of Fig. 3 in which the cooperating ridge and groove 46, 48 are out of registry. Cam 108 thereafter holds stub shaft 100 and rack 114 in the dot-and-dash position of Fig. 5 until cam 88 has permitted the pusher rod 80 to withdraw entirely from the aligned spindle 33 and into the full-line position of Fig. 3. During such withdrawal of pusher rod 80, the gear 116 thereon is moved relative to the rack 114 without being rotated as can be readily understood from Fig. 2, in which the parallel teeth of rack 114 and gear 116 are shown to be parallel to the pusher rod 80. Cam 108 may now safely return shaft 100 and rack 114 into the full-line position of Fig. 5 and rotate pusher rod 80 without rotating a spindle 33. Thus, during each intermittent rest period of the conveyor table 26, the pusher rod 80 is advanced in the direction of arrow 94 in Fig. 3, thereby first entering the adjacent notch 92 of an aligned spindle 33 with its key portion 90 and then advancing the spindle until the clip and condenser thereon reach the dot-and-dash position in Fig. 3. Immediately thereafter, cam 108 causes movement of stub shaft 100 and rack 114 into the dot-and-dash position in Fig. 5, thereby imparting to the pusher rod 80 and engaged spindle 33 one-half revolution to invert the condenser while in the dot-and-dash position of Fig. 3. Next, the cam disc 88 permits pusher rod 80 to return into the full-line position of Fig. 3, whereby spindle 33 as well as its clip and the condenser thereon are likewise returned under spring pressure into the full-line position of Fig. 3, in which the ridge 46 registers with the groove 48 and yieldingly locks the spindle against rotation. Cam 108 finally returns stub shaft 100 and rack 114 into the full line position in Fig. 5 without imparting rotary motion to spindle 33 as can be readily understood. These steps are repeated during each intermittent rest period of the conveyor table 26.

Sealing devices C

Referring particularly to Fig. 1, two containers 120 are adjustably mounted on suitable uprights 122. Each of these containers is provided on its bottom with a spout 124, the discharge opening of which is in axial alignment with an adjacent condenser end while the turntable is intermittently at rest. Each of the containers 120 holds a supply of liquefied wax or other suitable sealing substance which readily solidifies under ordinary atmospheric conditions. The wax in these containers is melted and maintained in a liquid state by any suitable heating means (not shown). The discharge opening of each spout 124 may be opened or closed by a needle valve (not shown) which is connected to a lever 126, pivotally mounted at 128 on an upright 122 and connected to an arm 130 by means of a lengthwise adjustable link 132. One of the arms 130 is shown pivotally mounted at 134 to a lug 136 of the support 22 and is in alignment with a cam disc 138 which is mounted on the cam shaft 52. The other arm 130 is likewise pivotally mounted on support 22 and actuated by a cam identical with 138 and mounted on the opposite end of cam shaft 52. A spring (not shown) or any other suitable yielding means may normally force each needle valve into closing engagement with the discharge opening of its spout 124. Rotation of cam shaft 52 causes cams 138 to depress the arms 130 simultaneously for a short period, thereby causing a withdrawal of the needle valves from their respective spouts and permitting escape of a certain quantity of liquid wax which flows into the adjacent open ends of condensers. The cams 138 are so coordinated with the other cams on the cam shaft 52, that wax is permitted to escape through the spouts 124 only while the conveyor table is at rest.

Mode of operation

The operator who is stationed at X, deposits condensers on the passing clips 30 of the conveyor with one hand and removes sealed condensers from other clips 30 with his other hand. The newly deposited condensers move successively into pouring alignment with the first sealing device C1, which pours a predetermined quantity of liquefied wax during intermittent rest periods of the conveyor A. By the time these condensers successively reach the inverter B, the wax deposit therein has become solidified, and the condenser to be presently inverted 180° during an intermittent rest period of the conveyor is first released for rotation from its yielding lock 46, 48 in the earlier described manner. This release of a condenser for inversion is graphically illustrated in row D of the chart in Fig. 9 by the line e—f relative to one complete revolution of the cam shaft 52. The condenser is then held released for a lapse of time as represented by the line f—g, and is finally returned into locked position after inversion as represented by the line g—h. While the condenser is held released, it is inverted 180° as represented by the line i—j of row E of the chart. A comparison between the rows D and E of the chart shows that the inversion is completed before the condenser is returned into locked position. The conveyor is indexed within a certain cycle of one revolution of the cam shaft 52 during which the inverter B is inactive. The indexing of the conveyor during one revolution of the cam shaft 52 is represented by the line m—n in row F of the chart.

After inversion, the condensers move successively into pouring alignment with the second sealing device C2 which automatically discharges the same quantity of liquefied wax as the first sealing device C1. Both sealing devices C are simultaneously operated and their pouring period is represented by the line o—p—q in row G of the chart. By the time the completely sealed condensers reach the loading and ejecting station X, the last applied wax seal has become solidified and the condensers have sufficiently cooled down to permit their removal from the conveyor with bare hands.

While the embodiment of the present invention as herein disclosed, constitutes a preferred form, it is to be understood that other forms might be adopted, all coming within the scope of the claims which follow.

What is claimed is as follows:

1. In a machine of the character described, the combination of a conveyor removably carrying vertically disposed condensers; means at a certain conveyor station for inverting a condenser on the conveyor; and two devices above the condensers and on opposite sides of said station, each device for sealing the adjacent end of an aligned condenser.

2. In a machine of the character described, the combination of an intermittently moving conveyor removably carrying vertically disposed condensers; means at a certain conveyor station for inverting a condenser on the conveyor; and two devices above the condensers and on opposite sides of said station, both devices being simultaneously operable during an intermittent stop of the conveyor only, each to seal the adjacent end of an aligned condenser.

3. In a machine of the character described, the combination of an intermittently moving conveyor removably carrying vertically disposed condensers; means at a certain conveyor station for inverting a condenser on the conveyor during an intermittent stop of the conveyor only; and two devices above the condensers and on opposite sides of said station, both devices being simultaneously operable during an intermittent stop of the conveyor only, each to deposit a sealing substance on the adjacent end of an aligned condenser.

4. In a machine of the character described, the combination of an intermittently moving conveyor; workholders rotatably carried by the conveyor; means yieldingly locking the workholders against rotation in two positions of angular displacements; and means at a certain conveyor station for rotating each workholder on the conveyor during an intermittent stop of the conveyor only.

5. In a machine of the character described, the combination of a conveyor removably carrying vertically disposed condensers; a mechanism for intermittently moving the conveyor; means at a certain conveyor station and operated in timed relation with the mechanism for inverting a condenser on the conveyor 180°; and two devices above the condensers and on opposite sides of said station, said devices being simultaneously operated in timed relation with the mechanism each to seal the adjacent end of an aligned condenser.

6. In a machine of the character described, the combination of an intermittently moved conveyor removably carrying vertically disposed condensers; mechanism at a certain conveyor station and operable during an intermittent stop of the conveyor only for inverting a condenser on the conveyor; and two devices above the condensers and on opposite sides of said station, said devices being simultaneously operated in timed relation with the mechanism and each device to seal the adjacent end of an aligned condenser.

7. In a machine of the character described, the combination of a movable conveyor having a plurality of grooves; a plurality of axially movable and rotatable workholders on the conveyor, each workholder having a ridge adapted to register with a groove in a certain angular position on the conveyor; means normally urging each workholder with its ridge into registry with the corresponding groove; and means at a certain conveyor station for removing an adjacent workholder with its ridge from a groove and for rotating said workholder.

8. In a machine of the character described, the combination of a movable conveyor; a plurality of rotatable workholders on the conveyor, each workholder providing a clutch element; means normally locking each workholder in a certain angular position against rotation; and a rotatable clutch element at a certain conveyor station and movable into driving engagement with the clutch element of an adjacent workholder for rendering the locking means ineffective and for rotating said workholder.

9. In a machine of the character described, the combination of a movable conveyor; a plurality of rotatable workholders on the conveyor, each workholder providing a driven clutch element; means normally locking each workholder in a certain angular position against rotation; a rotatable and movable driving clutch element at a certain conveyor station; and means operable alternately to move the driving clutch element into driving engagement with the clutch element of an adjacent workholder to render the locking means ineffective and to rotate said driving clutch element.

10. In a machine of the character described, the combination of a movable conveyor; a plurality of rotatable workholders on the conveyor, each workholder providing a driven clutch element; a rotatable and movable driving clutch element at a certain conveyor station; a device for moving the driving clutch element into driving engagement with the clutch element of an adjacent workholder; another device for rotating said driving clutch element; and means including a common rotatable shaft for alternately operating the devices.

11. In a machine of the character described, the combination of a movable conveyor; a plurality of rotatable workholders on the conveyor, each workholder providing a driven clutch element; a rotatable and movable driving clutch element at a certain conveyor station said driving clutch element being provided with a gear; a rack in permanent mesh with said gear and being movable relative to the latter to rotate the gear; a device for moving the driving clutch element into driving engagement with the clutch element of an adjacent workholder; and means including a common rotatable shaft for alternately operating the device and moving the rack relative to the gear.

12. In a machine of the character described, the combination of a movable conveyor; a plurality of rotatable workholders on the conveyor, each workholder providing a driven clutch element; a rotatable and movable driving clutch element at a certain conveyor station, said driving clutch element having an annular groove; a pivotally mounted clutch shifter rod acting through the annular groove; a device for rotating said driving clutch element; and means including a common rotatable shaft for alternately operating the device and rocking the shifter rod to cause engagement between the driving clutch element and the clutch element of an adjacent workholder.

13. In a machine of the character described, the combination of a movable conveyor; a plurality of rotatable workholders on the conveyor, each workholder providing a driven clutch element; a rotatable and movable driving clutch element provided with a gear and an annular groove; a rack in permanent mesh with said gear and being movable relative thereto to rotate the gear; a pivotally mounted clutch shifter rod acting through the annular groove; and means including a common rotatable shaft for alternately rocking the shifter rod to cause engagement between the driving clutch element and the clutch element of an adjacent workholder and moving the rack relative to the gear.

14. In a machine of the character described, the combination of a conveyor; mechanism for intermittently rotating the conveyor; a plurality of workholders rotatably mounted on the conveyor, each workholder being provided with a driven clutch element; a rotatable and movable driving clutch element; a device for moving the driving clutch element into driving engagement with the clutch element of an adjacent workholder; another device for rotating the driving clutch element; and means including a common rotatable shaft for successively operating the mechanism, the clutch moving device and then the clutch rotating device.

CHARLES A. NICHOLS.
LORA E. POOLE.